United States Patent
Leonard et al.

[15] 3,661,009
[45] May 9, 1972

[54] GAS QUALITY INDICATOR AND METHOD FOR DETERMINING GAS QUALITY

[72] Inventors: Robert G. Leonard, Franklin; Chester P. Surprise, Wauwatosa, both of Wis.

[73] Assignee: Johnson Service Company, Milwaukee, Wis.

[22] Filed: Apr. 2, 1970

[21] Appl. No.: 25,033

[52] U.S. Cl. .................................73/23, 73/28, 73/40.5
[51] Int. Cl. ..........................................G01n 21/06
[58] Field of Search.....................73/19, 23, 25, 28, 29, 73, 73/335, 336, 17, 40.5, 40.7, 49.4; 356/37, 36; 116/114 F, 114 N, 114 P, 114 AJ

[56] References Cited

UNITED STATES PATENTS

| | | |
|---|---|---|
| 2,119,288 | 5/1930 | Raymond.................................73/28 |
| 2,429,694 | 10/1947 | King .........................................73/29 |
| 2,506,806 | 5/1950 | Metzger...........................73/336 X |
| 3,060,747 | 10/1962 | Dunham................................356/37 |

Primary Examiner—Richard C. Queisser
Assistant Examiner—Ellis J. Koch
Attorney—A. J. De Angelis

[57] ABSTRACT

A compressed air line is provided with a coupling, including a shutoff valve for receiving a transparent, lineal, tubular member having a bore of relatively small diameter through which the compressed air is allowed to bleed to atmospheric pressure. The rate of bleeding is calibrated by means restricting the flow of air through the lineal member. The input end of the lineal member into which the air enters is provided with a coloring stage including a dye for coloring contaminates in the air. A contaminant adsorption stage of polyethylene of small micron size fills the remainder of the lineal tubular member. Bleeding of the gas to atmosphere at high velocity through the relatively small metered input to the tube causes the gas to expand suddenly by orifice action. The high velocity flow and rapid expansion of gas causes any vaporized contaminant particles to pick up dye, preferably bright red, as they flow through the coloring stage. The gas then flows at high velocity through the adsorption stage, creating sufficient turbulence to cause coalescence into colored drops which adhere to the polyethylene showing a progressive travel of color through the transparent lineal member with minimal loss of compressed gas in accordance with the amount of contaminant in the air. The rate of such color travel is calibrated and a scale along the length of the lineal member provides an output reading of the contamination in parts per billion sensitivity which may be read either directly in inches or in ounces of contamination per 100,000 cubic feet of air volume, depending on the scale used.

7 Claims, 5 Drawing Figures

PATENTED MAY 9 1972 3,661,009

INVENTORS:
ROBERT G. LEONARD
CHESTER P. SUPRISE
BY
A. J. DeAscli
ATTORNEY

GAS QUALITY INDICATOR AND METHOD FOR DETERMINING GAS QUALITY

The invention relates to a device for indicating the quality of compressed gas with respect to the presence therein of vaporous entrained liquids, including minute particles of submicron size.

In present day pneumatic and fluidic systems functioning with compressed gas, minute vaporized contaminant concentrations in the vary low parts per billion with respect to volume magnitude are found. Contamination of such a small degree usually cannot be readily detected prior to causing failures in such systems. Instruments available to detect such a low degree or "trace" of vaporized contamination are of the laboratory type, extremely expensive, sensitive and require specially trained personnel to operate. In addition, a substantial amount of time, often running into days, is required for their operation. These features undesirably limit their practical use in the usual compressed gas system for preventative maintenance measures.

For example, pneumatic and fluidic systems for long term, trouble free operation require compressed "pure" air. Yet the compressed air is supplied by oil lubricated air compressors, the air output of which necessarily includes traces of oil contaminant. The oil is entrained in the air as vapor and is not completely removable by the usual mechanical entrapment mechanisms. The oil vapor trace tends to coalesce and act as an obstruction to air flow at very small orifices. Such contamination has limited and delayed new applications of fluidics technology. Even where mechanical filtering effects partial elimination of the contaminant there is today no ready and cheap way to identify grossly contaminating compressors or monitor the potential failure of filtering mechanism in providing pure air for fluidic circuits.

It is, therefore, desirable to provide an inexpensive, easily manufactured and used, indicator of trace vapor contaminants in compressed gas systems, which indicator is of instrument sensitivity and yet requires no particular skill in application.

It is, therefore, an object of this invention to provide a greatly improved detector for contaminants of the vapor type in compressed gas systems, which detector is of instrument quality, detecting in the area of 1 part per billion volume and is readily applied to compressed gas systems for visually indicating contamination by a rate of color travel along a predetermined calibrated lineal path.

In carrying out the invention, according to a preferred embodiment applied to compressed gas systems for detecting vaporized oil traces therein, a lineal member of transparent material, having a very small bore extending throughout its length, is provided for placing into a bleed opening to the gas system. The lineal member is provided at its input end with a petroleum coloring input stage (containing a red dye) followed by a coalescing filtering stage of polyethylene filter material disposed along its longitudinal bore. The compressed gas is allowed to bleed through the lineal member at high velocity, exhausting to atmosphere at a predetermined rate with respect to the pressure of the gas system. Such high velocity flow through the lineal member makes the gas expand suddenly at the metered opening into the member, causing the oil vapor carried thereby to initiate a change of state and coalesce into minute gloubles. In this form the liquid gloubles in flowing through the coloring stage pick up coloring dye. In passing through the coalescing filter stage sufficient turbulence is created to cause the colored oil particles to be deposited on the filtering material, indicating by the rate of progressive color travel along the lineal member from its input opening towards its output opening the quantity of contaminant in the compressed gas. Such rate of progressive color travel is read against a calibrated scale to obtain a contamination reading.

Features and advantages of the invention will be seen from the above from the following description of the preferred embodiment, when considered in conjunction with the drawing and from the appended claims.

The invention will be described, for convenience, as applied to a compressed air system in which vaporized oil is a contaminant from the compressor; it being understood, nevertheless, that without departing from the scope of the invention, the invention is equally applicable to the systems of compressed gas other than air and contaminants other than oil, for example, hydrogen, in which certain non-petroleum type or non-oily substances may have been entrained in the process of storage of the gas under pressure.

Figure 1:
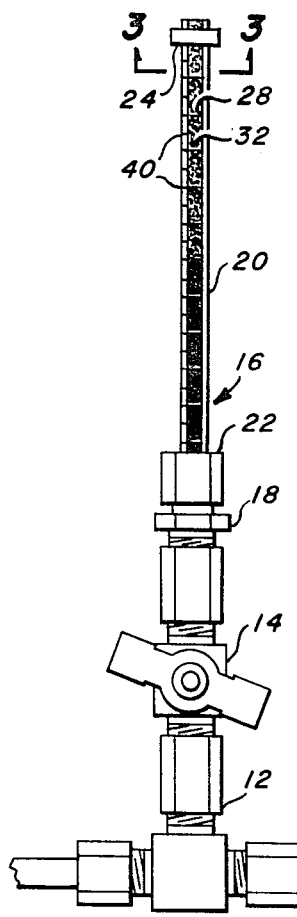
FIG. 1 is a simplified, diagramatic representation in front elevation of an air quality indicator, embodying the invention and showing the indicator coupled to piping of a compressed air system.

Referring to the drawings, a conduit 10 (FIG. 1) through which compressed air flows is provided with a T coupling 12 for receiving a needle valve 14. The valve provides manual on-off control of compressed air flow from conduit 10 to the subject indicator which is generally designated 16.

Indicator 16 comprises a male connector 18 for threading the indicator into the outlet of needle valve 14 and a transparent, thin tube 20 mounted by a compression fitting 22 onto fitting 18. Tube 20 is crimped near its upward end by a restrictor sleeve 24.

In one tested embodiment, tube 20 was formed of a transparent, plastic such as Eastman Company, Tenite Butyrate of H hardness and formula 529-37-201H with an inside diameter of one-sixteenth of an inch, an outside diameter of three-sixteenths of an inch and a length of approximately 3 inches.

Tube 20 is provided at the bottom or air input end of its longitudinal bore 28 with a ball of cotton 30 (FIG. 2) which has first been dipped in a petroleum dye. In preparation, the dye, say, petroleum coloring Keystone Aniling and Chemical Company oil red 6PR–PDR No. 6652, is dissolved in freon or in chlorothene. A ratio of approximately 2 parts of freon to 1 part of dye was found to provide a satisfactory solution. The cotton is soaked in the solution, removed and allowed to dry. It is then rolled into a cylindrical ball. In the meantime the remainder of bore 28 of the tube 20 is charged with a filtering material 32 to provide an adsorption or oil filtering stage throughout the lineal length of tube 20. In one tested embodiment, powdered polyethylene resin of 800 to 1,200 micron size, U.S. Industrial Chemical Company type MN706, was found satisfactory.

To calibrate indicator 16 with air at, say 20 pounds per square inch pressure the charge of polyethylene 32 in bore 28 of tube 20 should be packed with sufficient density to yield approximately 50 to 55 cubic inches per minute per square inch of filter (SCIM) air flow through tube 20. Retaining screens (not shown) may be placed at each end of the polyethylene charge in tube 20. The cotton ball is then tapped towards the polyethylene until approximately a flow of 32–35 SCIM is attained through the tube.

In one tested embodiment the calibration of the flow rate through tube 20 was obtained by the provision of a restrictor sleeve 24 (FIG. 1) near the output end of tube 20, which sleeve was crimped to restrict air passage through the tube 20 to the desired magnitude.

Figure 4:
FIG. 4 is an end view of tube 20 of FIG. 1, showing a slightly modified embodiment.
Figure 3:
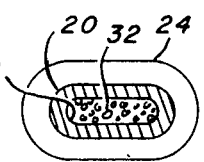
FIG. 3 is a cross-sectional view taken along line 3—3 of FIG. 1.

In another tested embodiment sleeve 24 was omitted and instead, as is shown in the cross-sectional view of FIG. 4, a retaining screen 36 of polyethylene and of 100 mesh size was placed at the output end of tube 20 by acetone bonding between the screen 36 and tube 20 without restricting the inside diameter aperture of the tube.

With the tube 20 charged and assembled in position as shown in FIG. 1 i.e. inserted into the upper end of valve 14 by compression fitting 22, the petroleum coloring stage is at the air input end of the tube, while the adsorption stage extends upward lineally along the entire tube length.

In operation, when needle valve 14 is opened, air under pressure flows from the compressed air system line 10 through needle valve 14 to the coloring stage 30 (FIG. 2) at the input end of tube 20 and thence through the adsorption stage 32, flowing through the whole length of tube 20 to outside atmosphere, or to a substantially lower pressure environment, as may be desired. Such flow through the relatively narrow bore 28 of tube 20 occurs at a substantially high velocity, causing the air in flowing through the metered valve 14 opening to expand quickly. Such rapid expansion of the gas causes the oil vapor entrained in the air to initiate a change in state from gas to liquid, i. e. to coalesce, forming oil gloubles. The oil drops in passing through petroleum coloring stage 30 pick up coloring dye (which is red). Their high velocity passage through the oil coalescing (filtering) stage 32 in venting to the much lower (atmospheric) outside pressure creates sufficient turbulence to cause the dyed red oil drops to adhere to the polyethylene particles. The dyed oil progressively colors the polyethylene charge in the narrow bore 28 from the bottom of tube 20 upwards in accordance with air flow to provide a visual rate of color travel indication of contamination along the tube length from the bottom of tube 20 towards its upward end in thermometer fashion.

The foregoing structure provides an oil detector of instrument quality detecting in the area of 1 part per billion, or one-tenth of an ounce per 100,000 cubic feet by volume trace concentrations of oil contaminant.

Figure 2:
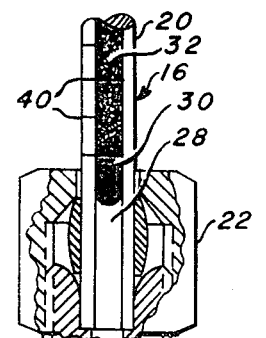
FIG. 2 is a fragmentary, partial view, greatly enlarged and with portions broken away of the lower portion of the indicator of FIG. 1 but modified with "quick disconnect" fitting for easy insertion and removal in the system piping of FIG. 1.

It may be noted that the bottom of the indicator 16 has been shown in FIG. 2 as modified with a "quick disconnect" type male fitting 42 for easy insertion in and removal from a cooperating quick disconnect female fitting (not shown) provided at the output side of valve 14, if desired, to facilitate the application of indicator 16 to monitored gas line 10.

Figure 5:
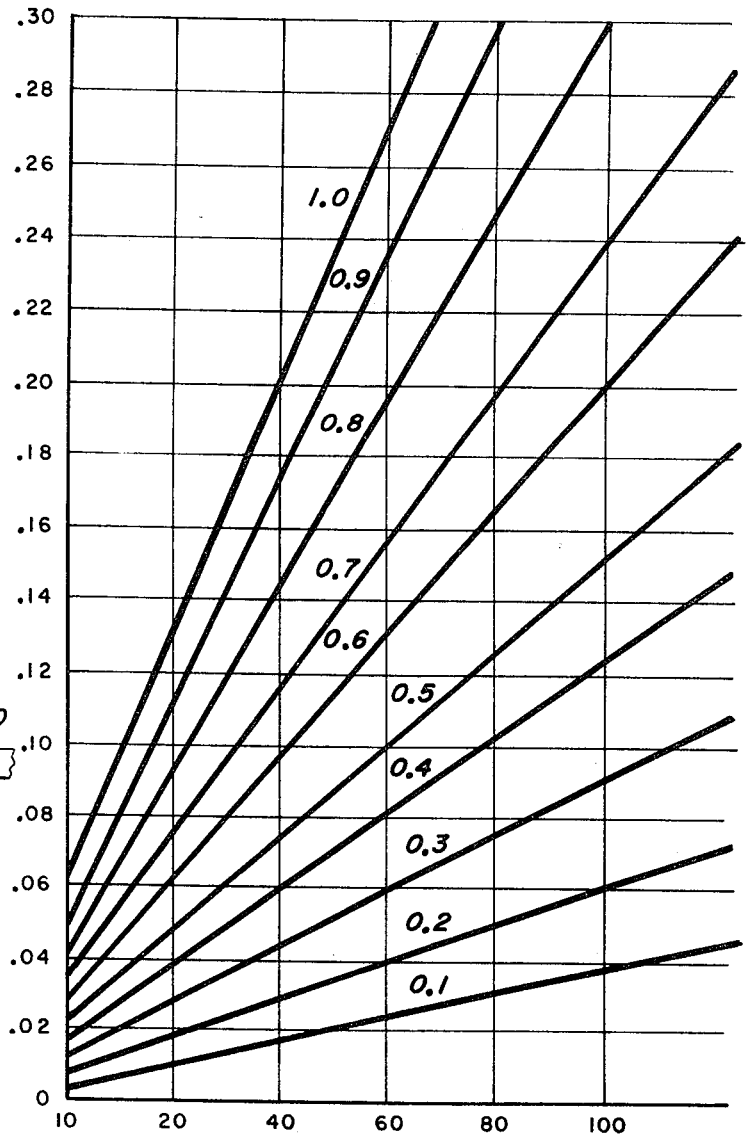
FIG. 5 is a calibration chart for the indicator of FIG. 1 for reading the amount of oil contamination in compressed air systems of various operating pressures.

The FIG. 5 representation of a calibration chart of oil trace contamination has a horizontal coordinate scaled in pounds per square inch of pressure of the compressed air being monitored, while the vertical coordinate is scaled in inches per hour of progressive color travel along the length of tube 20 in FIG. 1 from its bottom towards the top as the dye colored oil coalesces onto the polyethylene charge 32 from the air bleeding to atmosphere. The calibration chart is based on a tube charged for air flow at approximately 170 SCIM (cubic inches per minute per square inch of filter) at 80 pounds per square inch compressed air pressure. The family of lines extending upwardly from left to right on the chart represent measured trace contaminations in ounces of oil per 100,000 cubic feet of air volume. These were obtained by actual test and measurement by weighing of various contamination levels at the different operating pressures of the monitored air.

In addition, it was found in one tested embodiment that for a reading half way up the lineal length of tube 20 (FIG. 1), i.e. one-half scale, approximately 5 hours is required for an oil trace indicator monitoring the usual compressed pure air at 80 pounds per square inch pressure, and 24 hours is recommended for an indicator monitoring 20 pounds per square inch pressure compressed air.

Reading the chart, it is seen that for 80 pound pressure air a travel of 0.06 inches of color from the bottom towards the top along tube 20 per hour measures an oil contamination of between 0.2 and 0.3 ounces per 100,000 cubic feet of air flowing through tube 20. A color travel of 0.1 or one-tenth of an inch per hour along tube 20 indicates approximately 0.4 ounces of oil trace contamination per 100,000 cubic feet of air.

Utilizing this calibration chart, a scale, indicated generally as 40 (FIG. 1) can be applied on tube 20 along its lineal length in any convenient manner in either inches, or in ounces of contamination per 100,000 cubic feet for a given air pressure, as is desired. If the scale is marked off in inches of travel, the color travel can be read and converted into a rate of travel by dividing the reading by the number of hours of air flow. The rate of color travel in inches per hour can then be applied to the calibration chart to determine the contamination trace at the given pressure.

For example, in a given installation, an indicator 16 is inserted onto needle valve 14. At an appropriate time, when measurement is convenient, the needle valve is turned to its "on" position to allow air to bleed through tube 20 to atmosphere at high velocity. A measured time thereafter, for example, 24 hours for a 20 pound per square inch pressure air, or after 5 hours for 80 pound pressure air, needle valve 14 is closed and indicator 16 may be removed or read in place. The amount of progressive coloring along the tube is measured and converted into a rate of travel by dividing the measured length by the number of hours of air flow through the tube to obtain inches per hour of air flow through the tube to obtain inches per hour of color travel. This inches per hour of color, say 2 inches in 5 hours (0.4 inches per hour) may be marked off against the vertical coordinate of the calibration chart (FIG. 5) at the air pressure being monitored, say 80 pounds pressure, and a reading of the oil contamination of the air read directly from the line in ounces per 100,000 cubic feet nearest to the point of intersection of the vertical and horizontal chart coordinates, i.e. 0.4 and 80, yielding approximately 0.15 ounces per 100,000 cubic feet of air contamination.

The subject indicator, thus provides an easily manufactured and readily used indicator of vaporized contaminants in compressed gas, which indicator is of instrument quality, of extremely low cost and which can be operated by relatively untrained personnel and placed conveniently into compressed gas systems to indicate accurately 1 part per billion contamination. The indicator by evacuating to atmospheric pressure through an extremely small bore, long tube and needle valve 14 provides a relatively fast reading of the contamination without undue loss of gas and any undesirable affect on the gas pressure system being monitored. This enables early detection of "dirty" compressors and potential failure of filtering equipment making possible the use of fluidic devices and applications that were heretofore impractical.

It may be noted that indicator 16 need not be of straight configuration, as shown in FIG. 1, but may be of curved shape. All that is needed is that it provide a lineal path of flow for the escaping gas to provide a lineal path of progressive color travel which can be readily measured.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. An indicator of contaminants entrained in a gas flowing in a system under a certain relatively high pressure, comprising means for providing access to said gas flowing in said system, a member having a relatively narrow gas passageway extending along a certain lineal path and providing a gas input opening at one end of said passageway and an output opening at the other end, said member being mounting onto said access providing means for receiving bleed gas flow from said system at its said passageway input, contaminant coloring means (at) disposed in said gas passageway input of said member and spaced inwardly from said gas input opening for coloring contaminant as they flow therethrough, contaminant adsorption means disposed in said lineal passageway from adjacent said coloring means to substantially along its entire length towards said output opening and wherein means are provided for metering the flow of gas through said lineal passageway at a predetermined rate through said coloring means and adsorption means causing a sufficient pressure drop of said gas and sufficiently high velocity flow from said compressed (air) gas system through said passageway for causing at said input opening rapid expansion of said gas due to pressure drop and sufficient turbulence to cause vaporized contaminants entrained therein to coalesce picking up dye in flowing through said coloring means and become trapped in said adsorption means providing a progressive coloring of said adsorption means along said lineal passageway from said input end.

2. The indicator of claim 1 wherein said member is provided with means for visually observing said progressive coloring along said lineal passageway, and wherein said access means includes a valve for selectively controlling flow of bleed gas through said passageway.

3. An indicator as set forth in claim 2 wherein said output opening of said passageway is mounted for exhausting to an environment having substantially lower pressure than said certain pressure of said gas system.

4. The indicator of claim 1 where said contaminant is oil and wherein, said coloring means includes a petroleum coloring dye.

5. The indicator of claim 4 wherein said contaminant adsorption means comprises polyethylene of micron size in the range from 800 to 1,200 microns.

6. The indicator of claim 2 wherein a calibrated scale is provided along said lineal passageway from said input end towards said output end.

7. The indicator of claim 6 wherein said scale is calibrated in ounces of contaminant per volume of air flow.

* * * * *

UNITED STATES PATENT OFFICE
CERTIFICATE OF CORRECTION

Patent No. 3,661,009      Dated May 9, 1972

Inventor(s) Robert G. Leonard et al

It is certified that error appears in the above-identified patent and that said Letters Patent are hereby corrected as shown below:

Column 1, line 10, "vary" should read -- very --; line 62 and column 3, line 19, correct the misspelling of "globules"; column 2, line 39, "529" should read -- 529A --; line 45, "aniling" should read -- aniline --; lines 61 and 62 and column 3, line 52, cancel "per square inch of filter"; column 4, line 22, "say 2" should read -- say .2 --; line 23, ".4 inches per hour" should read -- .04 inches per hour --; line 29, ".4" should read -- .04 --; line 67, "mounting" should read -- mounted --; line 70, cancel "(at)"; column 5, line 7, cancel "(air)".

Signed and sealed this 19th day of December 1972.

(SEAL)
Attest:

EDWARD M. FLETCHER, JR.
Attesting Officer

ROBERT GOTTSCHALK
Commissioner of Patents